Patented May 12, 1942

2,282,832

UNITED STATES PATENT OFFICE 2,282,832

SEMICONDUCTING TAPE

Laurence W. Spooner, Pittsfield, Mass., assignor to General Electric Company, a corporation of New York No Drawing. Application November 24, 1939, Serial No. 305,933

4 Claims. (Cl. 201—76)

This invention relates to semi-conducting or resistance elements and particularly to semi-conducting or resistance tapes or foils comprising an organic binder the resistance value of which is substantially unchanged by subjection to high temperatures.

Semi-conducting bodies or resistance elements comprising an organic binder and a finely-divided conducting material, such as carbon black, graphite or powdered metal, are known. However, these semi-conducting or resistance elements, containing various binders such as resins including shellac, thermo-setting condensation products such as phenolic or alkyd resins, and various polymerization products such as the vinyl resins, are not completely satisfactory. In general, the resistance value of the finished elements does not remain stable or constant over long periods of time and when the elements are subjected to elevated temperatures short of the melting or decomposition temperatures a definite decrease in ohmic resistance takes place. Apparently, the decreased resistance or increased conductivity primarily is caused by the fact that the resinous binder, such as a phenolic resin binder, is never totally cured but rather the constituents thereof continue to react with one another, this reaction being accelerated with increased temperatures. This slow curing apparently is accompanied by a film shrinkage, resulting in a large decrease in the resistance value probably due to the fact that less space remains between the conducting particles and thus a greater number of the conducting particles are brought into actual contact with one another. Because of this continuing change in the resistivity, it is impossible to prepare resistance elements having a definite resistance. A further disadvantage results from the fact that those materials which are not heat hardenable have such low melting points that they cannot be employed under high temperature conditions encountered during the operation or use of certain electrical apparatus.

It is, therefore, an object of my invention to provide a heat stable semi-conducting or resistance element the resistance values of which are constant and may be accurately predetermined.

It is a further object of my invention to provide a semi-conducting tape or foil the resistance value of which is not continuously affected by hot oil, chlorinated organic compounds and hot resinous mixtures, when used in contact with these mediums.

Another object of my invention is to provide a tape or foil of predetermined electrical characteristics which may be wound into or onto various electrical structures wherever semi-conducting coatings or layers are desired.

A further object of my invention is to provide a flexible, tear and wear-resistant semi-conducting tape or foil the resistance value of which is not substantially changed by ordinary bending, flexing or other mechanical operations and which is inexpensive in its preparation and application.

Further objects and advantages will become apparent from the following description of my intention.

The tape forming the subject of my invention comprises finely-divided carbon black and unplasticized cellulose acetate and may suitably be prepared as follows: The finely-divided carbon black, preferably having a particle size equal to or less than 45 millimicrons is dispersed in a cellulose acetate solution, as by milling or grinding. The solvent for the ester may comprise any volatile liquid which can be removed from the finished tape at room temperature or any temperature above room temperature which will not detrimentally affect the cellulose acetate. Acetone is one such solvent. Small amounts of butyl cellosolve may be used along with the acetone provided substantially all of the cellosolve is removed during subsequent drying steps. Another suitable fugitive solvent is one consisting of 85 per cent acetone and 15 per cent toluol.

The above composition may be sprayed onto any suitable surface, such as a glass or metal plate, and allowed to dry after which it is cut into tape form for use or alternatively it may be applied by spraying or brushing to a backing material, such as cotton cloth, paper, or woven glass fabric, by well-known means and allowed to dry thereon. The paper used ordinarily should be of a porous type to allow impregnation thereof.

When a suitable fibrous backing, such as cloth or paper, is used, I prefer to apply the cellulose acetate-colloidal carbon-solvent mixture to the fibrous backing material by a method involving the vertical withdrawal of the cloth or paper from a cellulose acetate-carbon black bath of controlled and uniform viscosity (about 1 foot per minute is a satisfactory speed) without passing the coated material over any rolls or the like until the coating has become sufficiently dry to touch that it will not be affected by contact with the rolls. The coated material then is allowed to stand at room temperature or is subjected to elevated temperatures (for example, 2 hours at 110° C.) to remove the final traces of solvent or other volatile ingredients after which it is cut into any desired width and length. Heated rolls or a hot plate may be used to facilitate removal of the solvent. This procedure produces a tape having a substantially uniform resistivity throughout its entire length. The resistivity may be controlled by varying the carbon black content of the "acetate dope" or by varying the speed of withdrawal of the backing material from the dope or the viscosity of the dope. Ordinarily, it is best that the viscosity of the dope and the speed of withdrawal of the backing be so controlled as to produce a tape of good texture, that is, a tape in which the backing material is uniformly impregnated or filled only to such an extent that the cellulose acetate-carbon mixture is held principally within or between the backing fibers rather than on the surface of the backing sheet. Thus good flexibility of the final sheet is obtained.

Finely-divided or colloidal carbon black is admirably suited for the carrying out of my invention both because of its small particle size and because of its high "dry" resistivity. These two properties permit the use of large amounts of the conducting particles (as compared with metal powders having a low "dry" resistivity) so that a continuous path of contacting carbon particles may be obtained in the tape which will nevertheless possess a high resistance not obtainable with metal powders. Further additions of carbon black merely increase the number of high resistance paths in proportion to the amount of carbon added so that the resistivity may be varied in a definitely controlled manner. This control is not possible when metal powders are used because as soon as the concentration of the metal powder approaches that which is sufficient to produce a continuous electrical path within the foil, the resistivity will rapidly approach extremely low values. A further property of colloidal carbon black which makes it ideal for the practice of this invention is its extremely small particle size. The colloidal carbon does not tend to settle out from the cellulose acetate solution and thus adequate dispersion during the manufacturing process is assured at all times resulting in a product having substantially uniform resistance throughout.

I have found that the unplasticized cellulose acetate described above is an ideal binder for the finely-divided carbon particles. The semi-conducting material formed therefrom undergoes no chemical or physical change at moderately high temperatures, such as 150° C., whereas phenolic or alkyl resin bound resistance elements exhibit a continuing decrease in resistivity when subjected to elevated temperatures because of the previously mentioned chemical reaction taking place within the binder itself.

The semi-conducting or resistance material described herein is also outstanding in its ampere-volt characteristic. This characteristic is negative to a marked degree; that is, the element exhibits a pronounced decrease in resistance with any increase in the applied voltage or power. This property is desirable in a number of electrical applications.

As the conductivity of the tape for any given applied potential is logarithmically proportional to the carbon black content, the carbon content of the semi-conducting tape may be so regulated as to obtain any desired resistivity, other variables in manufacturing technique being held constant. As previously mentioned, these other factors, such as viscosity of the dope and speed of withdrawal of the backing, also influence the resultant resistivity and within limits it is often more convenient or desirable to adjust resistivity by one or more of these other factors rather than by varying the carbon content. However, a tape having a resistance approximating the desired resistivity may suitably be prepared by adding the required amount of carbon to the cellulose acetate solvent mixture.

I find that increased accuracy in results may be obtained by preparing two or more compositions of different carbon content, measuring the resistivity of tapes prepared therefrom, and thereafter mixing the two compositions in the desired proportions to obtain tapes or foils having the desired resistivity intermediate those values obtained from the control tapes and solutions. By way of example, it may be stated that at a measuring voltage of 100 volts per inch, a resistant tape or element prepared from 100 parts by weight cellulose acetate and 36 parts by weight colloidal carbon on a 0.008 inch cotton fabric backing will have a resistivity of about $10^5$ ohms. Under identical conditions, the use of 18 instead of 36 parts by weight colloidal carbon will produce a tape having a resistivity of $10^{10}$ ohms.

The tape forming the subject matter of my invention finds numerous applications in the electrical art. The fact that it is completely stable at 150° C. in air or at 95° C. in oil, chlorinated hydrocarbons, or in contact with various phenolic or alkyd resin condensation products makes it an ideal resistance material for transformer or capacitor applications. When placed in contact with certain of these substances, there may be a slight initial change in resistivity but thereafter the resistivity will remain substantially constant. A further advantage of my tape is that its resistivity is known prior to its application to the electrical apparatus, thus resulting in a saving of time in factory production and permitting a more accurate control than is possible by the use of metal foils, conducting paints, or the like.

My tape, having any desired predetermined resistivity, may also be used in power transformer electrostatic shields or current transformer and reactor shields as means for grading the electrical stresses at the edges of, or to replace, the metallic foils, etc. ordinarily used in these structures and it may be wrapped into these structures in the same manner as the metal foils. In these applications, the semi-conducting tape may be interlaminated with the impregnated paper tapes ordinarily used in manufacturing the shields. Due to its high resistance as compared with metal foils, my carbon black tape is superior to these metal bands or foils in grading the electrical stresses present in the above mentioned electrical structures.

The tape may also be used in the manufacture of laminated paper expulsion protector tubes. In this application, it replaces the semi-conducting paints previously used between laminations in the manufacture of these tubes, and has the additional advantage of not requiring long drying periods necessary for hardening the semi-conducting paint before the next layer of insulation can be applied. The resistance tape also may be used on motor generator or high voltage regulator coils or as radio resistors or capacitor discharge resistors.

A particularly advantageous application of my improved resistance tape or foil is in the preparation of bushings of the condenser type. By the usual method of preparing these bushings a meltable adhesive is applied to sheet insulation, such as bonded paper or cloth, as the sheet insulation passes over a hot plate and the coated sheet is then wound on a mandrel and finished to proper form and dimensions. This paper or other sheet insulation may be converted into a tape such as that forming the subject matter of my invention by the following procedure.

The cellulose ester-carbon black mixture is applied to the untreated sheet insulation by any of several well known means such as by brushing, spraying, flowing, dipping, or printing, just before the sheet insulation crosses the hot plate or the like used to melt the adhesive. The solvents contained in the cellulose ester composition are removed from the treated sheet as it contacts the hot plate and providing care is taken not to contaminate the cellulose ester-carbon black composition with shellac before this drying action takes place, little, if any, mixing of the cellulose ester and shellac or other resinous binder takes place. By this modification, one or more layers of my resistance tape may be easily wound into the insulating cores or cylinders as a means of distributing the electrical stresses therein. A porous paper or other sheet insulation will give conductance through the conducting layer while a dense sheet insulation will result in a sandwiched or spiral conductance. This construction in any of its variations enables one to produce a controlled resistivity or conductance within certain predetermined layers or areas.

What I claim as new and desire to secure by Letters Patent of the United States is:

1. A resistance element comprising a resistance composition consisting essentially of a mixture of unplasticized cellulose acetate and a conductive material consisting of finely-divided carbon black.

2. A resistance tape consisting of a fibrous sheet material coated and impregnated with a mixture of unplasticized cellulose acetate and colloidal carbon black.

3. A resistance tape consisting of a fibrous sheet material impregnated with a suspension of finely-divided carbon black in unplasticized cellulose acetate.

4. A resistance tape consisting of a colloidal solid suspension of carbon black in unplasticized cellulose acetate.

LAURENCE W. SPOONER.